US012130583B2

(12) United States Patent
Otsuka et al.

(10) Patent No.: US 12,130,583 B2
(45) Date of Patent: Oct. 29, 2024

(54) IMAGE FORMING APPARATUS AND METHOD FOR SWITCHING A CONTINUOUS PRINT MODE TO AN INTERMITTENT PRINT MODE

(71) Applicants: Taira Otsuka, Kanagawa (JP); Hiroyuki Sugiyama, Kanagawa (JP); Takuya Seshita, Kanagawa (JP)

(72) Inventors: Taira Otsuka, Kanagawa (JP); Hiroyuki Sugiyama, Kanagawa (JP); Takuya Seshita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/197,748

(22) Filed: May 16, 2023

(65) Prior Publication Data

US 2023/0408972 A1 Dec. 21, 2023

(30) Foreign Application Priority Data

May 19, 2022 (JP) ................................ 2022-082092

(51) Int. Cl.

*G03G 15/20* (2006.01)
*G03G 15/00* (2006.01)
*G03G 21/20* (2006.01)

(52) U.S. Cl.

CPC ............ *G03G 21/20* (2013.01); *G03G 15/50* (2013.01)

(58) Field of Classification Search

USPC .......................................................... 399/33
See application file for complete search history.

(56) References Cited

U.S. PATENT DOCUMENTS

| | | | |
|---|---|---|---|
| 2016/0342120 A1 | 11/2016 | Saitoh et al. | |
| 2019/0227472 A1 * | 7/2019 | Hara ..................... | G03G 21/20 |

FOREIGN PATENT DOCUMENTS

| | | |
|---|---|---|
| JP | 11-296039 | 10/1999 |
| JP | 2016-218429 | 12/2016 |

* cited by examiner

*Primary Examiner* — Quana Grainger
(74) *Attorney, Agent, or Firm* — XSENSUS LLP

(57) ABSTRACT

An image forming apparatus includes a fixing device, a temperature detector, and processing circuitry. The fixing device fixes a toner image on a surface of a sheet by heating of a heater. The temperature detector detects an internal temperature of the image forming apparatus. The processing circuitry switches a continuous print mode to an intermittent print mode when the internal temperature is equal to or higher than a first execution temperature during the continuous print mode. The processing circuitry cancels the intermittent print mode and switches to the continuous print mode when the internal temperature is equal to or lower than a first cancellation temperature. The processing circuitry causes the heater to stop heating the fixing device in the intermittent print mode when the internal temperature is higher than the first cancellation temperature even after a predetermined time has elapsed since a start of the intermittent print mode.

17 Claims, 7 Drawing Sheets

IMAGE FORMING APPARATUS AND METHOD FOR SWITCHING A CONTINUOUS PRINT MODE TO AN INTERMITTENT PRINT MODE

CROSS-REFERENCE TO RELATED APPLICATION

This patent application is based on and claims priority pursuant to 35 U.S.C. § 119(a) to Japanese Patent Application No. 2022-082092, filed on May 19, 2022, in the Japan Patent Office, the entire disclosure of which is hereby incorporated by reference herein.

BACKGROUND

Technical Field

Embodiments of the present disclosure relate to an image forming apparatus such as a copying machine, a printer, a facsimile machine, or a multifunction peripheral having at least two of copying, printing, and facsimile functions.

Related Art

In the related art, image forming apparatuses such as copying machines and printers are known to employ a technique of performing an intermittent print mode in which a print operation and a print operation suspension are alternately repeated in order to prevent a temperature in the image forming apparatuses from exceeding a predetermined value during continuous printing.

SUMMARY

Embodiments of the present disclosure described herein provide a novel image forming apparatus including a fixing device, a temperature detector, and processing circuitry. The fixing device fixes a toner image on a surface of a sheet by heating of a heater. The temperature detector detects an internal temperature of the image forming apparatus. The processing circuitry switches a continuous print mode that continuously performs a print operation on a plurality of sheets to an intermittent print mode that alternately repeats a print operation on a predetermined number of sheets and a print operation suspension for a predetermined time, when the internal temperature detected by the temperature detector is equal to or higher than a first execution temperature during execution of the continuous print mode. The processing circuitry cancels the intermittent print mode and switches the intermittent print mode to the continuous print mode, when the internal temperature detected by the temperature detector is equal to or lower than a first cancellation temperature, which is lower than the first execution temperature. The processing circuitry causes the heater to stop heating the fixing device in the intermittent print mode, when the internal temperature detected by the temperature detector is higher than the first cancellation temperature even after a predetermined time has elapsed since a start of execution of the intermittent print mode.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
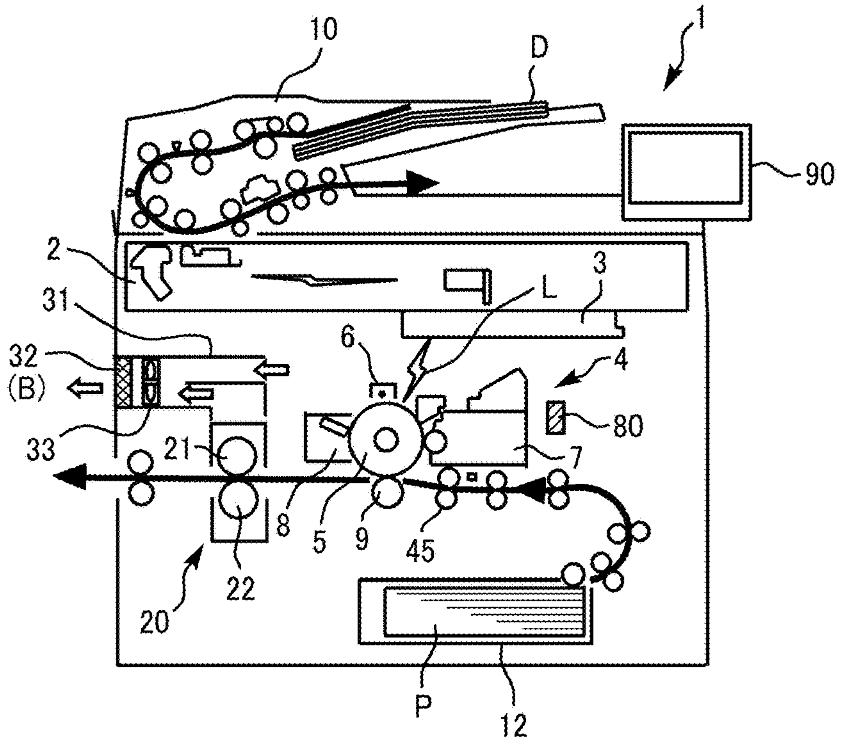
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a description is given of embodiments of the present disclosure with reference to the drawings. Note that identical reference numerals are assigned to identical components or equivalents and a redundant description of those components is simplified or omitted.

First, with reference to FIG. 1, a description is given of an overall configuration and operation of an image forming apparatus 1 according to an embodiment of the present disclosure.

In FIG. 1, the image forming apparatus 1 according to the present embodiment, illustrated as a copying machine, includes a scanner 2, an exposure device 3, and a photoconductor drum 5. The scanner 2 is a document reading device to optically read image data of an original document D. The exposure device 3 emits exposure light L, based on image data read by the scanner 2, onto a surface of the photoconductor drum 5.

The image forming apparatus 1 further includes an image forming unit 4, a charging device 6, a developing device 7, a cleaning device 8, and a transfer device 9 (transfer roller). The image forming unit 4 forms a toner image on a surface of the photoconductor drum 5 as a photoconductor or an image bearer. The charging device 6 charges the surface of the photoconductor drum 5. The developing device 7 develops a latent image formed on the photoconductor drum 5 to form the toner image. The cleaning device 8 removes toner remaining on the photoconductor drum 5 without being transferred. The transfer device 9 (transfer roller) transfers the toner image formed on the photoconductor drum 5 to a sheet P. The image forming unit 4 includes the photoconductor drum 5, the charging device 6, the developing device 7, the cleaning device 8, and the transfer device 9.

The image forming apparatus 1 further includes a document conveyance device 10, a sheet feeder 12 (sheet feed tray), a fixing device 20, and a timing roller pair 45 (registration roller pair). The document conveyance device 10 conveys the original document D set to the scanner 2. The sheet feeder 12 (sheet feed tray) loads sheets such as sheets P. The fixing device 20 heats a toner image (unfixed image) to fix the toner image on the sheet P. The timing roller pair 45 (registration roller pair) conveys the sheet P toward the transfer device 9 (transfer nip).

The image forming apparatus 1 further includes an exhaust duct 31, an exhaust filter 32, and an exhaust fan 33. The exhaust duct 31 guides hot air inside the image forming apparatus 1 to the outside. The exhaust filter 32 is disposed at an exhaust port B of the exhaust duct 31. The exhaust fan 33 generates an air flow from the inside of the image forming apparatus 1 to the outside (exhaust port B) of the image forming apparatus 1 in the exhaust duct 31. Since the hot air inside the image forming apparatus 1 is discharged to the outside through the exhaust duct 31, the temperature rise inside the image forming apparatus 1 is reduced. Note that the exhaust filter 32 collects ozone and ultra-fine particles (UFPs) included in the air discharged from the image forming apparatus 1.

The image forming apparatus 1 further includes an internal temperature sensor 80 (temperature sensor) and an operation display panel 90. The internal temperature sensor 80 is a temperature detector to detect the temperature inside the housing of the image forming apparatus 1 (internal temperature). The operation display panel 90 serves as a display on which information relating to a print operation (image forming operation) is displayed and on which an operation is performed.

A description is given of regular image forming operations performed by the image forming apparatus 1, with reference to FIG. 1.

The original document D is fed from a document loading table of the document conveyance device 10 and conveyed by multiple pairs of sheet conveying rollers disposed in the document conveyance device 10 in a direction indicated by arrow in FIG. 1 over the scanner 2. While the original document D is passing over the scanner 2, the scanner 2 optically reads image data of the original document D passing over the scanner 2.

The image data optically scanned by the scanner 2 is converted into electrical signals. The electrical signals are then transmitted to the exposure device 3 (writing device) serving as an optical writer. Then, the exposure device 3 emits the exposure light (laser light) L based on the image data of the electrical signals toward the surface of the photoconductor drum 5 of the image forming apparatus 1.

On the other hand, while the photoconductor drum 5 rotates clockwise in FIG. 1, a predetermined series of image forming processes, such as a charging process, an exposing process, and a developing process, are performed to form a toner image corresponding to the image data on the photoconductor drum 5. Thereafter, the image formed on the photoconductor drum 5 is transferred, at a position (transfer nip) facing the transfer device 9, onto the sheet P conveyed by the timing roller pair 45.

Specifically, the photoconductor drum 5 rotates clockwise in FIG. 1. First, the charging device 6 uniformly charges the surface of the photoconductor drum 5 at a position facing each other (a charging process). As a result, the surface of the photoconductor drum is charged to a charging potential.

As the photoconductor drum 5 further rotates, the charged surface of the photoconductor drum 5 is brought to a light emitting position of the exposure light L. Then, an electrostatic latent image based on the image information read by the scanner 2 is formed on the surface of the photoconductor drum 5 (an exposing process).

The surface of the photoconductor drum 5 having the electrostatic latent image comes to an opposing position to the developing device 7 including toner. The developing device 7 supplies toner onto the surface of the photoconductor drum 5 such that the electrostatic latent image formed on the surface of the photoconductor drum 5 is developed into a toner image (a developing process).

The surface of the photoconductor drum 5 after the developing process reaches a position (transfer nip) facing the transfer device 9. At the position of the transfer device the toner image formed on the photoconductor drum 5 is transferred onto the sheet P (a transferring process). Note that a transfer bias having a polarity different from the polarity of the toner is applied to the transfer device 9 (transfer roller).

After completion of the transferring process, the surface of the photoconductor drum 5 comes to an opposing position to the cleaning device 8. The cleaning device 8 removes and collects the toner remaining on the photoconductor drum 5 without being transferred (a cleaning process).

Thereafter, a discharger discharges the outer circumferential surface of the photoconductor drum 5, and a series of image forming processes performed on the photoconductor drum 5 ends.

Now, a description is given of how to operate the sheet P conveyed to the transfer nip region.

First, the uppermost one of the sheets P loaded in a sheet feeder 12 is fed by a sheet feeding roller toward a conveyance passage on which a plurality of conveyance roller pairs are disposed. Thereafter, the sheet P reaches the position of the timing roller pair 45. After reaching the timing roller pair 45, the sheet P is conveyed toward the transfer nip region in synchronization with movement of the toner image formed on the surface of the photoconductor drum 5 so that the toner image is placed at a proper position on the sheet P.

After the transfer device 9 transfers the toner image from the photoconductor drum 5 onto the sheet P in the transferring process, the sheet P is conveyed to the fixing device 20 along a sheet conveyance passage. In the fixing device 20, the sheet P (the sheet P on which an unfixed image is borne) is conveyed between a fixing roller 21 (in which a heater as a heating unit is provided) and a pressure roller 22, so that the toner image (image) is fixed to the sheet P by application of heat applied by the fixing roller 21 and pressure applied by the fixing roller 21 and the pressure roller 22. After having been fed from a portion (fixing nip region) between the fixing roller 21 and the pressure roller 22 of the fixing device 20, the sheet P having the toner image fixed thereto is ejected from the housing of the image forming apparatus 1 onto a sheet ejection tray.

Thus, a series of the image forming processes is finished.

Hereinafter, more detail descriptions are given of the fixing device 20 provided in the image forming apparatus 1.

Figure 2:
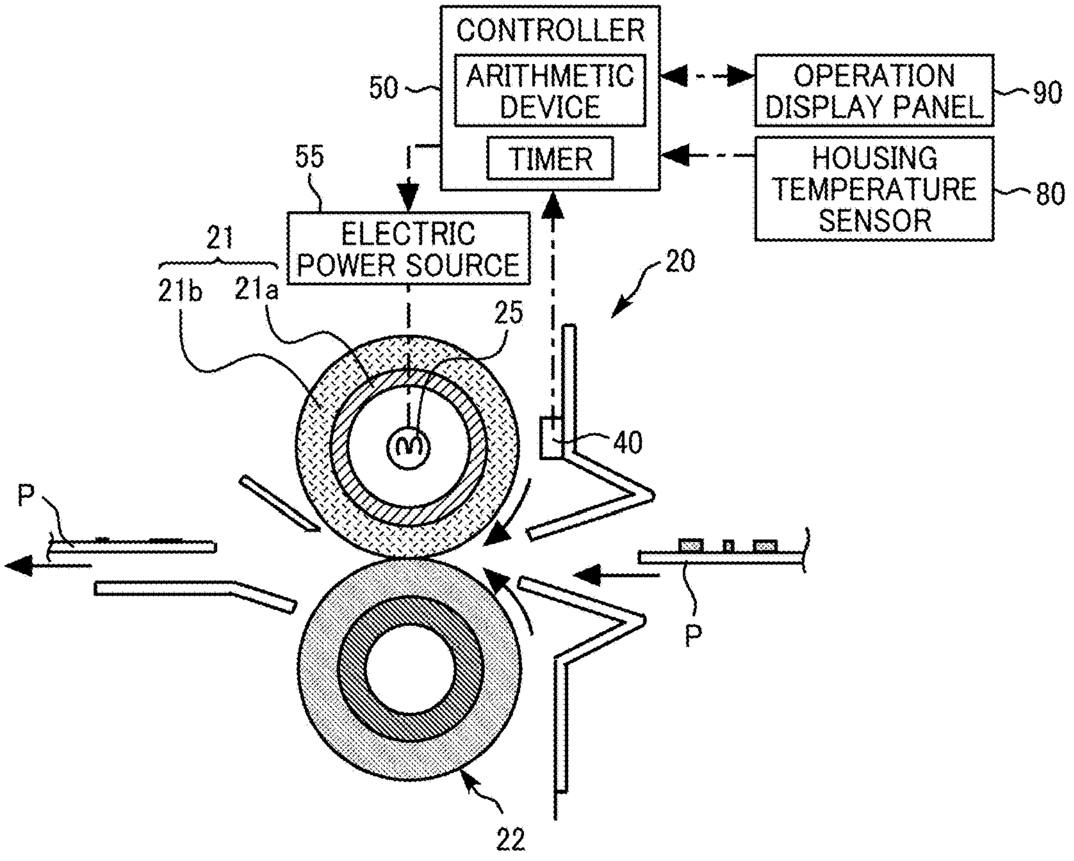
FIG. 2 is a diagram illustrating a configuration of a fixing device of the image forming apparatus of FIG. 1.

As illustrated in FIG. 2, the fixing device 20 includes a fixing roller 21, a heater 25 (fixing heater), a pressure roller 22, and a fixing temperature sensor 40 (fixing temperature detector). The fixing roller 21 is a fixing rotary member. The heater 25 is a heating unit to heat the fixing device 20 (fixing roller 21). The pressure roller 22 is a pressing rotary member.

The fixing roller 21 is a roller member having a multilayer structure in which a coating layer 21*b* (formed by laminating an elastic layer and a release layer) is formed on a core metal 21*a* having a hollow structure made of a metallic material such as stainless steel. The fixing roller 21 is pressed against the pressure roller 22 serving as a rotatable pressing member to form a nip region (fixing nip). The fixing roller 21 is rotated clockwise in FIG. 2 by a drive motor.

Inside the fixing roller 21 (core metal 21*a*) having a hollow structure, the heater 25 as a heating unit is disposed so as not to rotate. The heater 25 is a halogen heater formed in a rod shape, and both axial end portions of the heater 25 are fixed to side plates of the fixing device 20. When the image forming apparatus 1 is turned on, a power supply 55 supplies power to the heater 25. A controller 50 causes the heater 25 under output control to heat the fixing roller 21 with radiation heat from the heater 25, and then the fixing roller 21 further heated by the heater 25 applies heat from the surface of the fixing roller 21 to a toner image on the sheet P.

The controller 50, which include an arithmetic device having a function of calculating and a timer, is implemented by any desired circuitry such as central processing circuit (CPU). The controller 50 controls the output of the heater 25 based on the detection result of a surface temperature (fixing temperature) of the fixing roller 21 detected by a non-contact-type (or contact-type) fixing temperature sensor 40. The fixing temperature sensor 40 is disposed opposite the outer circumferential surface of the fixing roller 21. Specifically, the controller 50 determines a time for which the power supply 55 applies an alternating current voltage to the heater 25 based on the temperature detected by the fixing temperature sensor 40. The above-described control (turning on and off control) of the power supplied to the heater 25 adjusts the temperature (a fixing temperature) of the fixing roller 21 to a desired temperature (a target control temperature).

The pressure roller 22 serving as a rotatable pressing member is a roller member in which an elastic layer is formed on a core metal. As the fixing roller 21 rotates, the pressure roller 22 rotates counterclockwise in FIG. 2.

A description is given of a configuration and operation of the image forming apparatus 1 according to the present embodiment.

As described above with reference to FIGS. 1 and 2, the image forming apparatus 1 according to the present embodiment includes the fixing device 20 that is heated by the heater (fixing heater) serving as a heating unit and fixes the toner image on the surface of the sheet P. The heater 25 serving as a heating unit is controlled to be turned on and off based on a fixing temperature (a temperature detected by the fixing temperature sensor 40) in the fixing device 20 in a continuous print mode.

The image forming apparatus 1 includes an internal temperature sensor 80 as a temperature detector that detects the temperature inside the image forming apparatus 1 (internal temperature). The internal temperature sensor 80 is a temperature sensor that indirectly (or directly) detects the temperature of the image forming unit 4 that forms a toner image on the surface of the photoconductor drum 5 (photoconductor). Specifically, the internal temperature sensor 80 is disposed in the vicinity of the developing device 7 (image forming unit 4) and detects the surrounding temperature (ambient temperature). Information on the temperature (internal temperature) detected by the internal temperature sensor 80 is sent to the controller 50 (see FIG. 2), Accordingly, the controller 50 recognizes the change in the internal temperature of the image forming apparatus 1.

The image forming apparatus 1 according to the present embodiment is configured to execute a "continuous print mode" in which a print operation (image forming process) on a plurality of sheets P is continuously performed.

Specifically, aspects of the "continuous print mode" include, for example, a case where a plurality of sheets are printed (or copied) for one sheet of a document D set on the document feed tray of the document conveyance device 10 (or on the exposure glass of the scanner 2) and a case where a plurality of sheets are respectively printed (or copied) for a plurality of sheets of documents D set on the document feed tray of the document conveyance device 10. Such a continuous print mode is executed based on an operation or instruction of the operation display panel 90 by a user.

In any case, a desired number of sheets P are sequentially fed from the sheet feeder 12 at intervals (sheet intervals), and the image forming process (printing) described above with reference to FIG. 1 is continuously executed in one job in synchronization with the sheets P sequentially fed from the sheet feeder 12. In the continuous print mode, the operation of the image forming apparatus 1 does not stop. Except for the point that the sheet feeder 12 (or the document conveyance device 10) intermittently feeds the sheets P (or the documents D), other driving members and electrical components are continuously operated.

Figure 3:
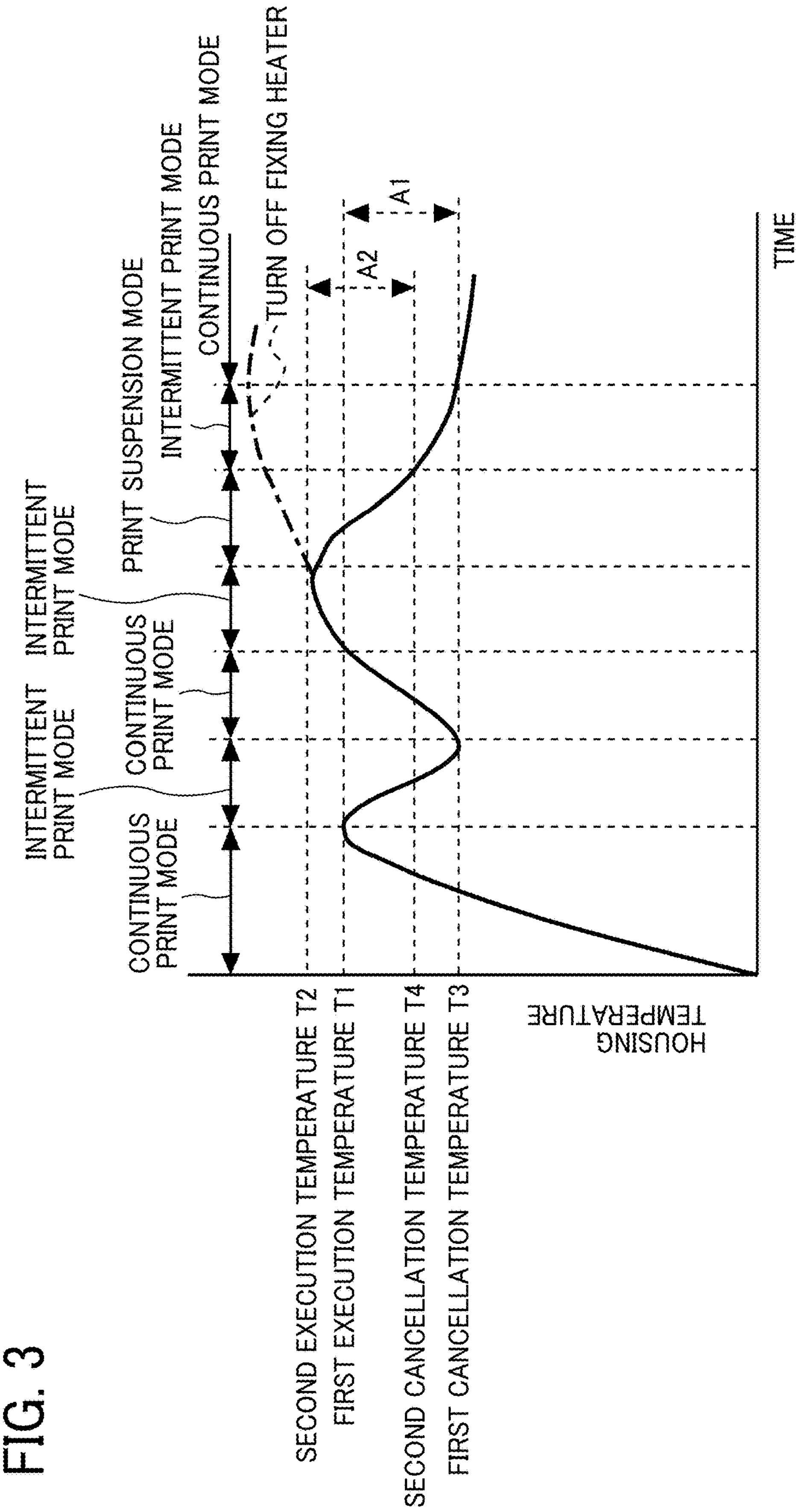
FIG. 3 is a graph illustrating an example of a change in print mode starting with a continuous print mode according to an embodiment of the present disclosure.

Referring to FIGS. 3 and 5, in the present embodiment, when the temperature detected by the internal temperature sensor 80 (temperature detector) is equal to or higher than a first execution temperature T1 (for example, about 49° C.) during execution of the "continuous print mode", the mode is switched to an "intermittent print mode" in which a print operation for a predetermined number of sheets and a print operation suspension for a predetermined time are alternately repeated. When the temperature detected by the internal temperature sensor 80 (temperature detector) is equal to or lower than a first cancellation temperature T3 (which is lower than the first execution temperature T1 and is, for example, about 47° C.), the execution of the "intermittent print mode" is cancelled and the mode is switched to the "continuous print mode".

In other words, in FIG. 3, the intermittent print mode is executed when the internal temperature is in a range A1.

As described above, in the "intermittent print mode", the print operation for a predetermined number of sheets (for example, three sheets) and the suspension of the print operation for the predetermined time N (for example, 10 seconds) are alternately repeated, and a plurality of print operations are performed in a plurality of jobs in contrast to the continuous print mode in which a plurality of print operations are performed in one job. As a result, when the intermittent print mode is executed, the productivity of printing decreases compared to the continuous print mode. However, since the print operation is intermittently stopped, the increase in the internal temperature is likely to be reduced (the internal temperature is likely to decrease).

Referring to FIGS. 3 and 5, in the present embodiment, the "intermittent print mode" is set such that heating of the fixing device 20 (fixing roller 21) by the heater 25 (heating unit) is stopped when the temperature detected by the internal temperature sensor 80 (temperature detector) is higher than the first cancellation temperature T3 even after a predetermined time M1 has elapsed since the start of the intermittent print mode.

In the intermittent print mode, as in the continuous print mode, heating of the fixing device 20 by the heater 25 (heating by turning on and off control) is performed. However, in a case where the internal temperature does not decrease as intended even after switching to the intermittent print mode, the intermittent print mode is continued in a state where the heater 25 is turned off on the assumption that another factor prevents the internal temperature from decreasing. In other words, the intermittent print mode includes a first intermittent print mode in which the heater 25 is turned on and a second intermittent print mode in which the heater 25 is turned off.

Figure 4:
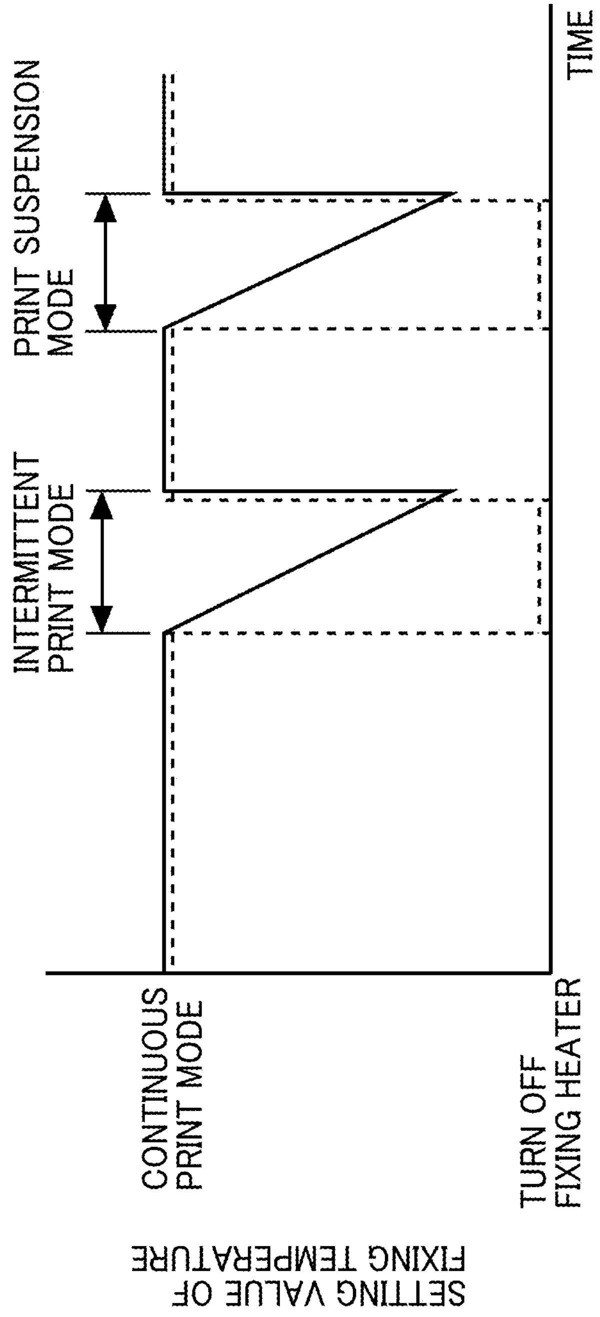
FIG. 4 is a graph illustrating an example of a relation between a change in a setting value of a fixing temperature and a change in an actual fixing temperature starting with the continuous print mode according to an embodiment of the present disclosure.

To be more specific, referring to FIG. 3, in the intermittent print mode, when the internal temperature changes (traces) as indicated by the dash-single-dot line, the heater 25 (power supply 55) is turned off on the assumption that the internal temperature does not decrease to the first cancellation temperature T3. As described above, when the heater 25 (power supply 55) is turned off in the intermittent print mode, the target control temperature (fixing temperature setting) of the fixing temperature by the fixing temperature sensor 40 is lowered from that in the continuous printing as indicated by a dashed line in FIG. 4, and accordingly, the fixing temperature is lowered as indicated by a solid line in FIG. 4.

Such control described above is performed since, even when the print mode is switched to the intermittent print mode, the internal temperature of the image forming apparatus 1 may not decrease as intended in a case where any other factor than the execution of the continuous print mode prevents a decrease in the internal temperature of the image forming apparatus 1.

Other factors that prevent a decrease in the internal temperature of the image forming apparatus 1 include the temperature (room temperature) of the installation location of the image forming apparatus 1 being too high, the exhaust port B (see FIG. 1) of the image forming apparatus 1 being blocked (or nearly blocked) by a wall in the room, the exhaust fan 33 (see FIG. 1) being out of order, and the exhaust filter 32 (see FIG. 1) being clogged.

When the intermittent print mode is executed and the temperature rise in the image forming apparatus 1 is not sufficiently reduced, the toner may aggregate or melt in the image forming unit 4 due to the temperature rise. Accordingly, a problem such as a decrease in quality of a print image or a failure of the image forming unit 4 may occur.

On the other hand, in the present embodiment, since the heater 25 (power supply 55) can be turned off in the intermittent print mode, the temperature rise in the image forming apparatus 1 can be sufficiently reduced even in a case where another factor prevents the temperature drop in the image forming apparatus 1 as described above. Especially, in the present embodiment, the print mode is switched based on the internal temperature of the image forming apparatus 1 detected by the internal temperature sensor 80 disposed in the vicinity of the image forming unit 4. As a result, problems such as a decrease in quality of a print image due to aggregation or melting of toner in the image forming unit 4 caused by an increase in temperature and a failure of the image forming unit 4 can be efficiently reduced.

The heater 25 (power supply 55) can be turned off when the print operation is suspended in the intermittent print mode (for the predetermined time N during which the print operation is suspended) to prevent a decrease in the fixing performance of the sheet P to be printed.

As illustrated in FIGS. 3 and 5, in the present embodiment, when the temperature detected by the internal temperature sensor 80 (temperature detector) is equal to or higher than the second execution temperature T2 (higher than the first execution temperature T1) during execution of the intermittent print mode, the mode is switched to a "print suspension mode" in which the print operation is suspended. Then, when the temperature detected by the internal temperature sensor 80 (temperature detector) is equal to or lower than a second cancellation temperature T4 (higher than the first cancellation temperature T3 and lower than the second execution temperature T2), the execution of the print suspension mode is cancelled, and the mode is switched to the intermittent print mode.

In other words, in FIG. 3, the print suspension mode is executed when the internal temperature is in a range A2.

As described above, in the "print suspension mode", the print operation is interrupted and suspended. When the print suspension mode is executed, the productivity of printing decreases compared to the intermittent print mode. However, as the print operation is suspended, the increase in the internal temperature of the image forming apparatus 1 is likely to be reduced (the internal temperature of the image forming apparatus 1 is likely to decrease) accordingly.

Referring to FIGS. 3 and 5, in the present embodiment, when the temperature detected by the internal temperature sensor 80 (temperature detector) is higher than the second cancellation temperature T4 even after a predetermined time M2 has elapsed since the start of the print suspension mode, the heater 25 (heating unit) is configured to stop heating of the fixing device 20 (fixing roller 21) in the "print suspension mode".

In the print suspension mode, the heater 25 heats the fixing device 20 (performs heating by turning on and off control) in the same manner as in the continuous print mode. However, in a case where the internal temperature of the image forming apparatus 1 does not decrease as intended even when the intermittent print mode is switched to the print suspension mode, the image forming apparatus 1 determines that another factor prevents the internal temperature of the image forming apparatus 1 from decreasing, and continues the print suspension mode in a state where the heater 25 is turned off. In other words, the print suspension mode includes a first print suspension mode in which the heater 25 is turned on and a second print suspension mode in which the heater 25 is turned off.

To be more specific, referring to FIG. 3, in the case where the in internal temperature of the image forming apparatus 1 changes (traces) as indicated by the dash-single-dot line even when the intermittent print mode is shifted to the print suspension mode, the heater 25 (power supply 55) is turned off assuming that the internal temperature of the image forming apparatus 1 does not fall to the second cancellation temperature T4. As described above, when the heater 25 (power supply 55) is turned off in the print suspension mode, the target control temperature (fixing temperature setting) of the fixing temperature by the fixing temperature sensor 40 is lowered from that in the continuous printing as indicated by a dashed line in FIG. 4, and accordingly, the fixing temperature is lowered as indicated by a solid line in FIG. 4.

Such control described above is performed since, even when the intermittent print mode is switched to the print suspension mode, the internal temperature of the image forming apparatus 1 may not decrease as intended in a case where another factor prevents the decrease in the internal temperature of the image forming apparatus 1 as described above.

When the print suspension mode is executed and the temperature rise in the image forming apparatus 1 is not sufficiently reduced, the toner may aggregate or melt in the image forming unit 4 due to the temperature rise. Accordingly, a problem such as a decrease in quality of a print image or a failure of the image forming unit 4 may occur.

On the other hand, in the present embodiment, since the heater 25 (power supply 55) can be turned off in the print suspension mode, the temperature rise in the image forming apparatus 1 can be sufficiently reduced even in a case where another factor prevents the temperature drop in the image forming apparatus 1 as described above.

FIG. 3 is a graph illustrating an example of a change in print mode starting with a continuous print mode.

In the example of FIG. 3, after the continuous print mode starts, the internal temperature of the image forming apparatus 1 reaches the first execution temperature T1, and the print mode is shifted to the intermittent print mode. After that, the internal temperature of the image forming apparatus 1 decreases to the first cancellation temperature T3 to resume the continuous print mode, and the internal temperature of the image forming apparatus 1 reaches the first execution temperature T1 to shift to the intermittent print mode. However, before the predetermined time M1 elapses, the internal temperature of the image forming apparatus 1 increases to the second execution temperature T2 to shift to the print suspension mode. Then, as indicated by the solid line, the internal temperature of the image forming apparatus 1 decreases to the second cancellation temperature T4 and the intermittent print mode is resumed, and the internal temperature of the image forming apparatus 1 further decreases to the first cancellation temperature T3 and the continuous print mode is resumed.

In the present embodiment, when the "intermittent print mode" is switched to the "print suspension mode", control is performed such that a message for lowering the internal temperature of the image forming apparatus 1 (internal temperature) is displayed on the operation display panel 90 as a display.

Specifically, as described above, when the intermittent print mode is shifted to the print suspension mode, a factor prevents a decrease in the internal temperature of the image forming apparatus 1 in addition to the print mode. As a result, a message for eliminating such a factor is displayed on the operation display panel 90 to ask a user to cope with the factor.

Examples of the message to be displayed include "Please check the room temperature as it may be too high", "Please make sure that the exhaust port of the apparatus is not blocked", "The exhaust fan may need maintenance, and so please check with your service person", and "Please replace the exhaust filter."

By displaying such a message, a factor that prevents a decrease in the internal temperature of the image forming apparatus 1 can be eliminated.

In the present embodiment, even when the heater 25 is turned off during execution of the intermittent print mode, the same messages as described above can be displayed for the same reason.

In the present embodiment, even when the temperature detected by the internal temperature sensor 80 (temperature detector) is equal to or higher than the second execution temperature T2 during execution of the intermittent print mode, control of the intermittent print mode can be changed such that the intermittent print mode is continuously executed without being switched to the print suspension mode.

In the present embodiment, as described above, the heater 25 is turned off when the internal temperature of the image forming apparatus 1 does not decrease to the first cancellation temperature T3 even after the predetermined time M1 has elapsed from the start of the intermittent print mode. When the internal temperature of the image forming apparatus 1 increases to the second execution temperature T2 before the predetermined time M1 elapses from the start of the intermittent print mode, the mode is switched to the print suspension mode. When the heater 25 is turned off as in the former case described above, the continuous print mode is resumed when the internal temperature drops to the first cancellation temperature T3. When the print mode is shifted to the print suspension mode as in the latter case described above, the internal temperature drops to the second cancellation temperature T4 and the print mode is shifted to the intermittent print mode. When the internal temperature finally drops to the first cancellation temperature T3, the continuous print mode is resumed. However, depending on the state of use of the image forming apparatus 1 by a user, the time (resume time) to resume the continuous print mode may be totally shorter when the former control alone (first control, that is, the intermittent print mode) described above is performed than when the former control and the latter control (second control, that is, the intermittent print mode and the print suspension mode) described above are performed together.

The image forming apparatus 1 may be configured such that the user can select whether the former control (first control) and the latter control (second control) described above are performed together or the former control alone is performed. For example, as described referring to FIG. 5B, information on whether to execute the first control and the second control, or to execute the first control, may be determined according to the user preference, such as a setting preset by the user. By doing so, the image forming apparatus 1 can be provided with high productivity for the user.

Further, the resume time when the former control and the latter control described above are performed together and the resume time when the former control alone is performed may be predicted from the use situation of the image forming apparatus 1 by the user using artificial intelligence (AI), and the prediction result may be displayed on the operation display panel 90. By doing so, the user can select a setting suited to his or her needs based on the prediction result.

Hereinafter, a description is given of an example of a control process starting with the continuous print mode in the present embodiment, with reference to FIG. 5A. The operation of FIG. 5A is performed by the controller 50.

Figure 5A:
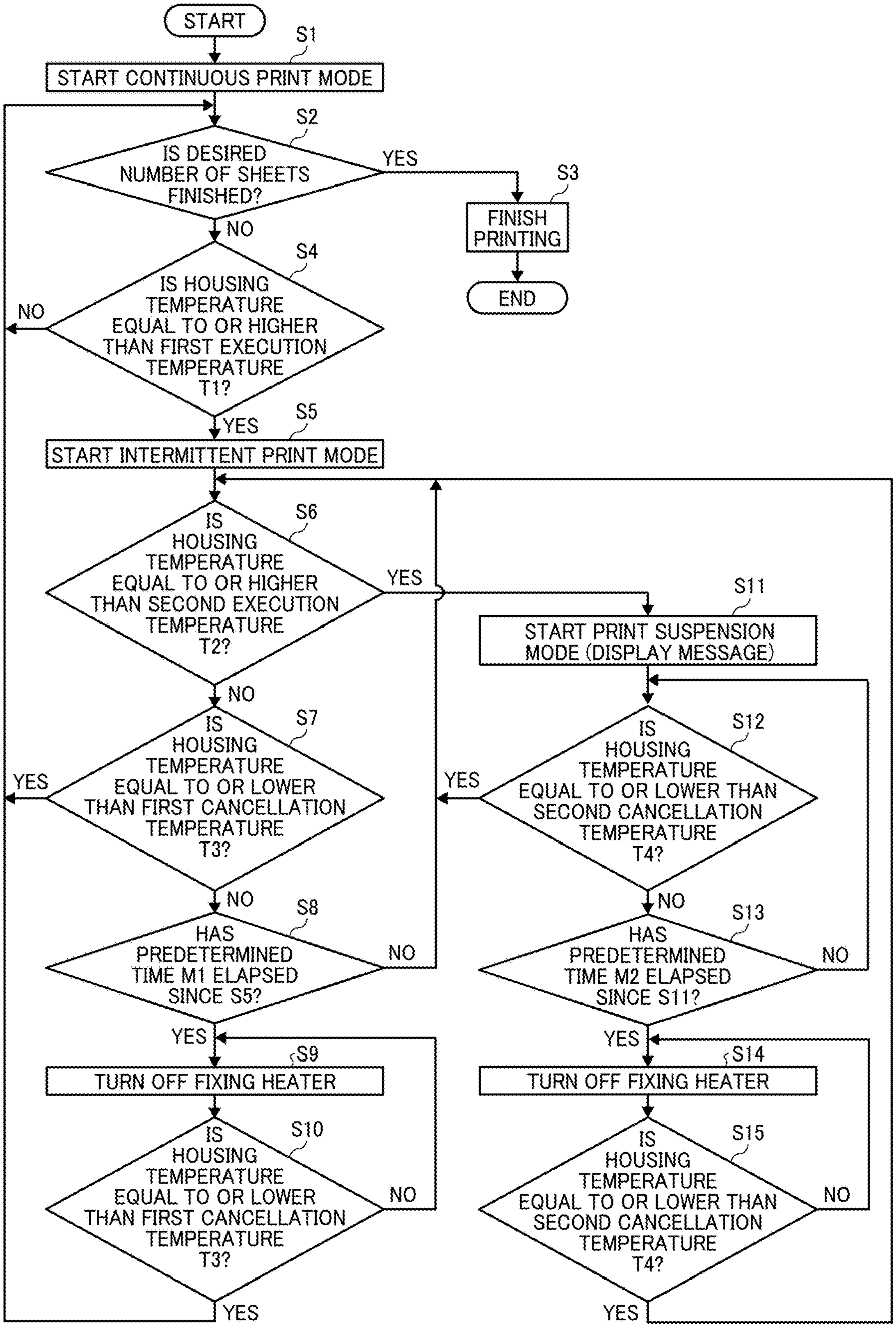
FIG. 5A is a flowchart of an example of control in the continuous print mode according to an embodiment of the present disclosure.
Figure 5B:
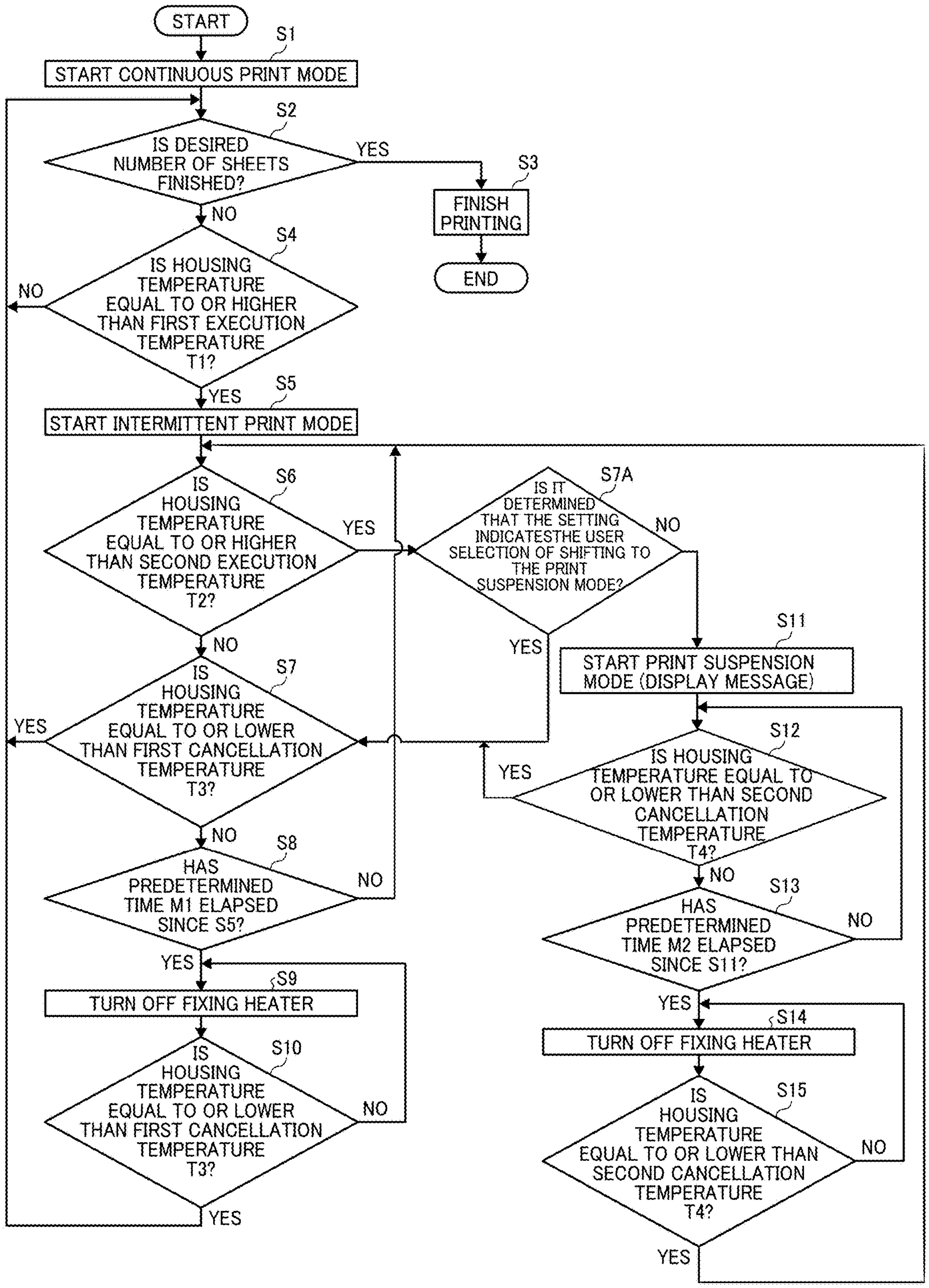
FIG. 5B is a flowchart of an example of control in the continuous print mode according to another embodiment of the present disclosure.

As illustrated in FIG. 5A, in step S1, the continuous print mode is started by the operation on the operation display panel 90 by the user. In step S2, the image forming apparatus 1 determines whether the printing of the desired number of sheets based on the operation or instruction of the user is finished. When the printing of the desired number of sheets is finished (YES in step S2), in step S3, it is determined that a series of printing (job) is finished.

On the other hand, when the printing of the desired number of sheets is not finished (NO in step S2), in step S4, the image forming apparatus 1 determines whether an internal temperature T detected by the internal temperature sensor 80 is equal to or higher than the first execution temperature T1. When the internal temperature T does not reach the first execution temperature T1 (NO in step S4), the continuous print mode is continued, and the process after step S1 is repeated.

On the other hand, when the internal temperature T reaches the first execution temperature T1 (YES in step S4), in step S5, the continuous print mode is interrupted, and the intermittent print mode is started. In step S6, the image forming apparatus 1 determines whether the internal temperature T is equal to or higher than the second execution temperature T2. When the internal temperature T does not reach the second execution temperature T2 (NO in step S6), in step S7, the image forming apparatus 1 determines whether the internal temperature T has decreased to the first cancellation temperature T3 or lower while the intermittent print mode is continued. When the internal temperature T is equal to or lower than the first cancellation temperature T3 (YES in step S7), the image forming apparatus 1 determines that the internal temperature T sufficiently has decreased and various problems due to temperature rise do not occur, and resumes the continuous print mode and repeats the process from step S2 onward. Note that the determination in step S6 is executed until the predetermined time M1 elapses after the intermittent print mode is started in step S5.

When the image forming apparatus 1 determines that the internal temperature T is not equal to or lower than the first cancellation temperature T3 (NO in step S7), in step S8, the image forming apparatus 1 determines whether the predetermined time M1 has elapsed since the start of the intermittent print mode in step S5. When the predetermined time M1 has elapsed (YES in step S8), in step S9, the heater 25 (fixing heater) is turned off. Then, while the image forming apparatus 1 continues the intermittent print mode in a state where the heater 25 is turned off, in step S10, the image forming apparatus 1 determines whether the internal temperature T has decreased to the first cancellation temperature T3 or lower. When the image forming apparatus 1 determines that the internal temperature T is equal to or lower than the first cancellation temperature T3 (YES in step S10), the image forming apparatus 1 determines that the internal temperature T is sufficiently lowered and various problems due to temperature rise do not occur, and resumes the continuous print mode and repeats the process from step S2 onward.

On the other hand, when the image forming apparatus 1 determines in step S6 that the internal temperature T has reached the second execution temperature T2 (YES in step S6), in step S11, the intermittent print mode is interrupted, and the print suspension mode is started. At this time, a message for lowering the internal temperature of the image forming apparatus 1 is displayed on the operation display panel 90.

Then, in step S12, the image forming apparatus 1 determines whether the internal temperature T has decreased to the second cancellation temperature T4 or lower while the print suspension mode is continued. When the internal temperature is equal to or lower than the second cancellation temperature T4 (YES in step S12), the image forming apparatus 1 determines that the internal temperature T gradually decreases and a problem does not occur even when printing is performed, and resumes the intermittent print mode and repeats the process from step S6 onward.

On the other hand, when the image forming apparatus 1 determines that the internal temperature T is not equal to or lower than the second cancellation temperature T4 (NO in step S12), in step S13, the image forming apparatus 1 determines whether a predetermined time M2 has elapsed since the start of the print suspension mode in step S11. When the predetermined time M2 has elapsed (YES in step S13), in step S14, the heater 25 (fixing heater) is turned off. Then, while the image forming apparatus 1 continues the print suspension mode in a state where the heater 25 is turned off, in step S15, the image forming apparatus 1 determines whether the internal temperature T has decreased to the second cancellation temperature T4 or lower. When the image forming apparatus 1 confirms that the internal temperature T is equal to or lower than the second cancellation temperature T4 (YES in step S15), the image forming apparatus 1 determines that the internal temperature T smoothly decreases and a problem does not occur even when printing is performed, and resumes the intermittent print mode and repeats the process from step S6 onward.

As described above, the image forming apparatus 1 may be configured to allow the user to select not to shift to the print suspension mode, even when the internal temperature T reaches the second execution temperature T2. More specifically, in such case, when the image forming apparatus 1 determines in step S6 that the internal temperature has reached the second execution temperature T2 (YES in step S6), the operation proceeds to S7A. In step S7A, the controller 50 determines whether the setting indicates a user selection of not to shift to the print suspension mode (that is, execution of the second control). When it is determined that the setting indicates the user selection of not to shift to the print suspension mode (YES in step S7A), the operation proceeds to step S7, so that the image forming apparatus 1 operates under the first control. When it is determined that the setting indicates the user selection of shifting to the print suspension mode (NO in step S7A), the operation proceeds to S11, so that the image forming apparatus 1 operates under the first control and the second control.

Modification

Figure 6:
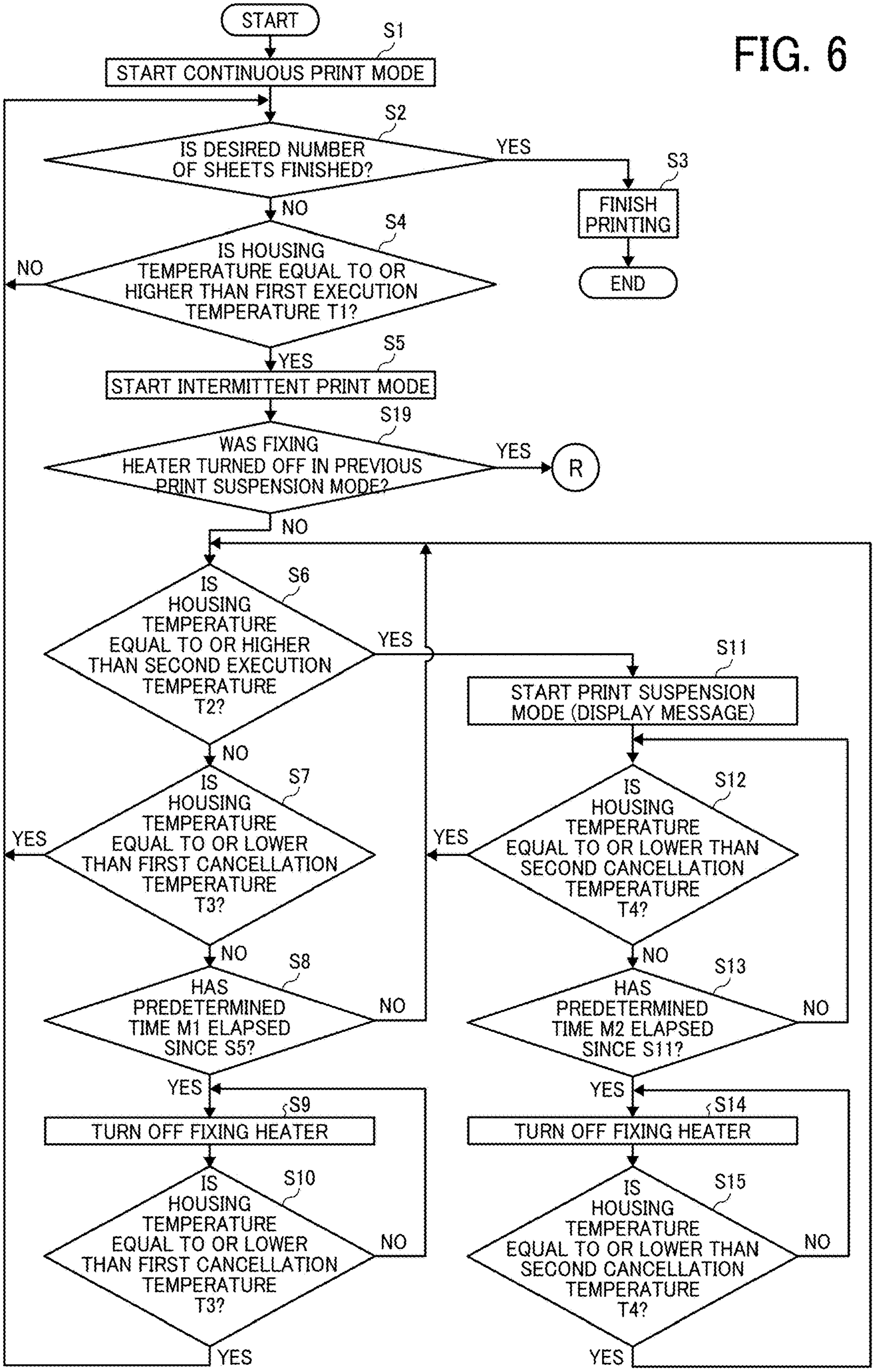
FIG. 6 is a flowchart of a modification example of the control of the continuous print mode illustrated in FIGS. 5A and 5B.
Figure 7:
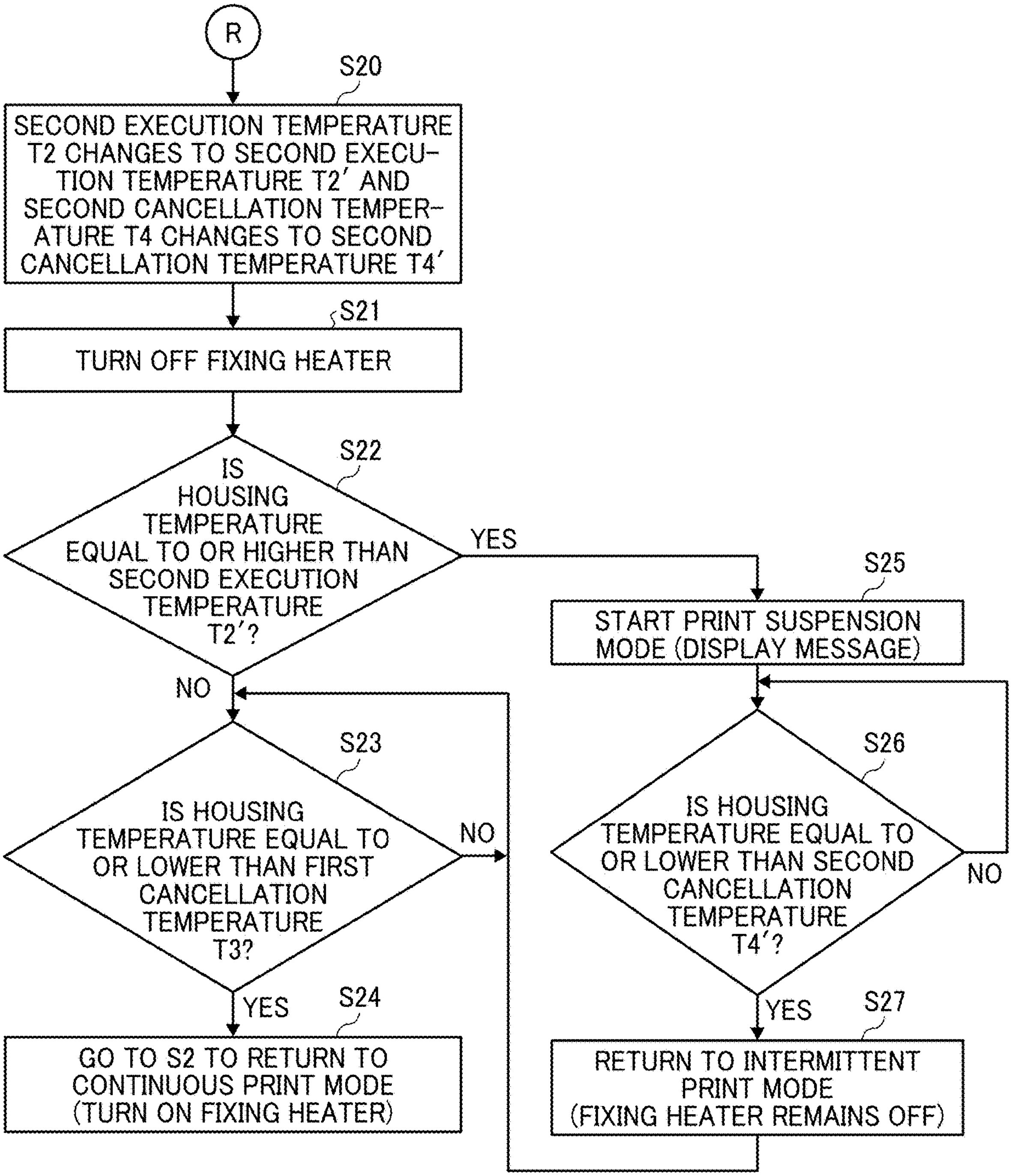
FIG. 7 is a flowchart of an example of the control subsequent from FIG. 6.

Referring to FIGS. 6 and 7, when heating of the fixing device 20 by the heater 25 (heating unit) is stopped in the "print suspension mode", an image forming apparatus 1 according to a modification of the above-described embodiment performs control such that the heater 25 stops heating the fixing device 20 from the next start of execution of the "intermittent print mode" or the "print suspension mode".

In other words, in one round of the continuous print mode, when the print mode is shifted first to the print suspension mode, the print mode is switched between the first print suspension mode in which the heater 25 is turned on and the second print suspension mode in which the heater 25 is turned off in accordance with the situation of the decrease in the internal temperature. However, when the second print suspension mode (with the heater 25 turned off) is executed first in the print suspension mode and then the intermittent print mode is resumed or the print suspension mode is executed again, the intermittent print mode or the print suspension mode after the second print suspension mode is executed in a state where the heater 25 is turned off.

When the second print suspension mode is executed first in the print suspension mode, it is assumed that a large factor is likely to prevent a decrease in the internal temperature as described above. Accordingly, the internal temperature can be efficiently decreased by keeping the heater 25 in the off state from the beginning in the intermittent print mode or the print suspension mode that is performed after the second print suspension mode. For this reason, the above-described control is performed.

In the present modification, when heating of the fixing device 20 by the heater 25 (heating unit) is stopped in the "print suspension mode", at least one of the second execution temperature T2 and the second cancellation temperature T4 is controlled to be changed at the next execution of the intermittent print mode or the print suspension mode.

In other words, in one round of the continuous print mode, when the second print suspension mode (with the heater 25 turned off) is executed after the print mode is shifted first to the print suspension mode, the intermittent print mode may be resumed or the print suspension mode may be executed again after the second print suspension mode. Even in such a case, the second execution temperature T2 and the second cancellation temperature T4 are changed in the intermittent print mode or the print suspension mode after the second print suspension mode. To be more specific, in the present modification, the second execution temperature T2 and the second cancellation temperature T4 are each lowered by about 2° C. from the initial setting temperature.

When the second print suspension mode is executed first in the print suspension mode, it is assumed that a large factor is likely to prevent a decrease in the internal temperature as described above. Accordingly, the image forming apparatus 1 optimizes (changes) the second execution temperature T2 and the second cancellation temperature T4 in the intermittent print mode or the print suspension mode executed after the second print suspension mode. Thus, the image forming apparatus 1 can quickly confirm whether the factor that prevents a decrease in the internal temperature is eliminated. For this reason, the above-described control is performed.

Hereinafter, a description is given of a control process starting with the continuous print mode in the present modification, with reference to FIGS. 6 and 7.

As illustrated in FIG. 6, in step S1, the continuous print mode is started by the operation of the operation display panel 90 by the user. Then, steps S2 to S15 are performed in the same manner as in FIG. 5A described above. However, the image forming apparatus 1 determines whether the heater 25 (fixing heater) was turned off in the previous print suspension mode, in step S19 that is executed between step S5 and step S6. When the image forming apparatus 1 determines that the heater 25 was not turned off in the previous print suspension mode (NO in step S19), the process from step S6 onward is repeated.

On the other hand, when the image forming apparatus 1 determines in step S19 that the heater 25 was turned off in the previous print suspension mode (YES in step S19), the control process illustrated in FIG. 7 is executed.

As illustrated in FIG. 7, in step S20, the initially set second execution temperature T2 and second cancellation temperature T4 are changed to a second execution temperature T2' and a second cancellation temperature T4', respectively. In step S21, the heater 25 (fixing heater) is turned off. In step S22, the image forming apparatus 1 determines whether the internal temperature T is equal to or higher than the second execution temperature T2'.

When the internal temperature T is not equal to or not higher than the second execution temperature T2' (NO in step S22), in step S23, the image forming apparatus 1 determines whether the internal temperature T has decreased to the first cancellation temperature T3 or lower while continuing the intermittent print mode with the heater 25 turned off. When the internal temperature is equal to or lower than the first cancellation temperature T3 (YES in step S23), in step S24, the image forming apparatus 1 determines that the internal temperature T is sufficiently lowered, and resumes the continuous print mode (with the heater 25 turned on) to repeat the process from step S2 onward.

On the other hand, when the internal temperature T is equal to or higher than the second execution temperature T2' in step S22 (YES in step S22), the intermittent print mode is interrupted, and the print suspension mode is started in step S25. Then, in step S26, the image forming apparatus 1 determines whether the internal temperature T has decreased to the second cancellation temperature T4' or lower while continuing the print suspension mode. When the internal temperature T is equal to or lower than the second cancellation temperature T4' (YES in step S26), in step S27, the image forming apparatus 1 determines that the internal temperature T has decreased smoothly, and resumes the intermittent print mode (with the heater 25 remaining in the off state) to repeat the process after step S23 onward.

As described above, the image forming apparatus 1 according to the present embodiment includes the fixing device 20 that fixes a toner image on the surface of a sheet P by heating of the heater 25 (heating unit) and the internal temperature sensor 80 (temperature detector) that detects the internal temperature of the image forming apparatus 1. When the temperature detected by the internal temperature sensor 80 is equal to or higher than the first execution temperature T1 during the execution of the continuous print mode that continuously performs the print operation on a plurality of sheets P, the print mode is switched to the intermittent print mode that alternately repeats the print operation on a predetermined number of sheets and the print operation suspension for a predetermined time. After that, when the temperature detected by the internal temperature sensor 80 is equal to or lower than the first cancellation temperature T3, which is lower than the first execution temperature T1, the intermittent print mode is cancelled and switched to the continuous print mode. In the intermittent print mode, the heater 25 stops heating the fixing device 20 when the temperature detected by the internal temperature sensor 80 does not decrease to the first cancellation temperature T3 even after the predetermined time M1 has elapsed since the start of execution of the intermittent print mode.

As a result, the temperature rise in the image forming apparatus 1 can be sufficiently reduced.

It is to be noted that the image forming apparatus 1 according to an embodiment is a monochrome image forming apparatus but the configuration of an image forming apparatus according to an embodiment of the present disclosure is not limited thereto. For example, an image forming apparatus according to an embodiment of the present disclosure may be a color image forming apparatus.

Further, in the above-described embodiment, the image forming apparatus includes the fixing device 20 of a thermal heater type using the heater 25 as a heating unit. However, an image forming apparatus according to an embodiment of the present disclosure is not limited to such an apparatus. According to an embodiment of the present disclosure, for example, an image forming apparatus may include an induction heating (IH) type fixing device using an electromagnetic induction coil as a heating unit, or an image forming apparatus may include a resistance heating type fixing device using a resistance heating element as a heating unit.

Even when any of the above-described image forming apparatuses is employed, the same effect as the image forming apparatus 1 according to the above-described embodiment can be provided.

Note that embodiments of the present disclosure are not limited to the above-described embodiments, and it is apparent that the above-described embodiments can be appropriately modified within the scope of the technical idea of the present disclosure in addition to what is suggested in the above-described embodiments. Further, features such as the number, the position, and the shape of each of the above-described components are not limited to those of the above-described embodiments and thus may be any other suitable number, position, and shape.

Aspects of the present disclosure may be, for example, a combination of the following Aspects 1 to 8.

Aspect 1

An image forming apparatus includes a fixing device and a temperature detector. The fixing device fixes a toner image on a surface of a sheet by heating of a heater. The temperature detector detects an internal temperature of the image forming apparatus. When the internal temperature detected by the temperature detector is equal to or higher than a first execution temperature during execution of a continuous print mode that continuously performs a print operation on a plurality of sheets, the continuous print mode is switched to an intermittent print mode that alternately repeats a print operation on a predetermined number of sheets and a print operation suspension for a predetermined time. When the internal temperature detected by the temperature detector is equal to or lower than a first cancellation temperature, which is lower than the first execution temperature, the intermittent print mode is cancelled and switched to the continuous print mode. In the intermittent print mode, the heater stops heating the fixing device when the internal temperature detected by the temperature detector does not decrease to the first cancellation temperature even after a predetermined time has elapsed since a start of execution of the intermittent print mode.

Aspect 2

In the image forming apparatus described in Aspect 1, when the internal temperature detected by the temperature detector is equal to or higher than a second execution temperature, which is higher than the first execution temperature, during execution of the intermittent print mode, the intermittent print mode is switched to a print suspension mode that suspends a print operation. Thereafter, when the internal temperature detected by the temperature detector is equal to or lower than a second cancellation temperature, which is higher than the first cancellation temperature and lower than the second execution temperature, the print suspension mode is cancelled and switched to the intermittent print mode.

Aspect 3

In the image forming apparatus described in Aspect 2, when the intermittent print mode is switched to the print suspension mode, the image forming apparatus displays, on a display, a message for lowering the internal temperature of the image forming apparatus.

Aspect 4

In the image forming apparatus described in Aspect 2 or 3, even when the internal temperature detected by the temperature detector is equal to or higher than the second execution temperature during execution of the intermittent print mode, the image forming apparatus changes control of the intermittent print mode such that the intermittent print mode is continuously executed without being switched to the print suspension mode.

Aspect 5

In the image forming apparatus described in any of Aspects 2 to 4, when the internal temperature detected by the temperature detector is higher than the second cancellation temperature even after a predetermined time has elapsed since a start of the print suspension mode, the heater stops heating the fixing device.

Aspect 6

In the image forming apparatus described in Aspect 5, after the heater stops heating the fixing device in the print suspension mode, the heater stops heating the fixing device from a start of next execution of the intermittent print mode or the print suspension mode.

Aspect 7

In the image forming apparatus described in Aspect 5 or 6, after the heater stops heating the fixing device in the print suspension mode, at least one of the second execution temperature and the second cancellation temperature is changed at next execution of the intermittent print mode or the print suspension mode.

Aspect 8

In the image forming apparatus described in any of Aspects 1 to 7, the heater is controlled to be turned on and off based on a fixing temperature in the fixing device in the continuous print mode. The temperature detector is a temperature sensor to detect a temperature of an image forming unit that forms a toner image on a surface of a photoconductor.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

a fixing device configured to fix a toner image on a surface of a sheet by heating of a heater;

a temperature detector configured to detect an internal temperature of the image forming apparatus; and processing circuitry configured to:

switch a continuous print mode that continuously performs a print operation on a plurality of sheets to a first intermittent print mode that alternately repeats a print operation on a predetermined number of sheets and a print operation suspension for a predetermined time, when the internal temperature detected by the temperature detector is equal to or higher than a first execution temperature during execution of the continuous print mode;

cancel the first intermittent print mode and switch the first intermittent print mode to the continuous print mode, when the internal temperature detected by the temperature detector is equal to or lower than a first cancellation temperature, which is lower than the first execution temperature; and cancel the first intermittent print mode and switch the first intermittent print mode to a second intermittent print mode, when the internal temperature detected by the temperature detector is higher than the first cancellation temperature after a predetermined time has elapsed since a start of execution of the first intermittent print mode, wherein during the first intermittent print mode, the heating of the fixing device is performed as the continuous print mode, and wherein during the second intermittent print mode, the heating of the fixing device is turned off.

2. The image forming apparatus according to claim 1, wherein, under a first control, the processing circuitry is configured to:

switch the first intermittent print mode to a print suspension mode that suspends a print operation, when the internal temperature detected by the temperature detector is equal to or higher than a second execution temperature, which is higher than the first execution temperature, during execution of the first intermittent print mode; and cancel the print suspension mode and switch the print suspension mode to the first intermittent print mode, when the internal temperature detected by the temperature detector is equal to or lower than a second cancellation temperature, which is higher than the first cancellation temperature and lower than the second execution temperature.

3. The image forming apparatus according to claim 2, wherein the processing circuitry is configured to display a message for lowering the internal temperature of the image forming apparatus on a display when the first intermittent print mode is switched to the print suspension mode.

4. The image forming apparatus according to claim 2, wherein, under a second control, the processing circuitry is configured to continuously execute the first intermittent print mode and/or the second intermitted print mode without being switched to the print suspension mode, irrespective of whether the internal temperature detected by the temperature detector is equal to or higher than the second execution temperature during execution of the first intermittent print mode and/or the second intermitted print mode, and wherein the processing circuitry changes operation of the image forming apparatus between the first control and the second control.

5. The image forming apparatus according to claim 2, wherein the processing circuitry is configured to cause the heater to stop heating the fixing device, when the internal temperature detected by the temperature detector is higher than the second cancellation temperature even after a predetermined time has elapsed since a start of the print suspension mode.

6. The image forming apparatus according to claim 5, wherein the processing circuitry is configured to cause the heater to stop heating the fixing device from a start of next execution of the first intermittent print mode or the print suspension mode, after the heater stops heating the fixing device in the print suspension mode.

7. The image forming apparatus according to claim 5, wherein the processing circuitry is configured to change at least one of the second execution temperature or the second cancellation temperature at next execution of the first intermittent print mode or the print suspension mode, after the heater stops heating the fixing device in the print suspension mode.

8. The image forming apparatus according to claim 1, wherein the processing circuitry is configured to control turning on and off the heater based on a fixing temperature in the fixing device in the continuous print mode, and wherein the temperature detector is a temperature sensor that detects a temperature of an image forming unit that forms a toner image on a surface of a photoconductor.

9. An image forming apparatus comprising:

a fixing device configured to fix a toner image on a surface of a sheet by heating of a heater;

a temperature detector configured to detect an internal temperature of the image forming apparatus; and processing circuitry configured to:

switch a continuous print mode that continuously performs a print operation on a plurality of sheets to an intermittent print mode that alternately repeats a print operation on a predetermined number of sheets and a print operation suspension for a predetermined time, when the internal temperature detected by the temperature detector is equal to or higher than a first execution temperature during execution of the continuous print mode;

cancel the intermittent print mode and switch the intermittent print mode to the continuous print mode, when the internal temperature detected by the temperature detector is equal to or lower than a first cancellation temperature, which is lower than the first execution temperature; and cause the heater to stop heating the fixing device in the intermittent print mode, when the internal temperature detected by the temperature detector is higher than the first cancellation temperature after a predetermined time has elapsed since a start of execution of the intermittent print mode, wherein, under a first control, the processing circuitry is configured to:

switch the intermittent print mode to a print suspension mode that suspends a print operation, when the internal temperature detected by the temperature detector is equal to or higher than a second execution temperature, which is higher than the first execution temperature, during execution of the intermittent print mode; and cancel the print suspension mode and switch the print suspension mode to the intermittent print mode, when the internal temperature detected by the temperature detector is equal to or lower than a second cancellation temperature, which is higher than the first cancellation temperature and lower than the second execution temperature, wherein the processing circuitry is configured to cause the heater to stop heating the fixing device, when the internal temperature detected by the temperature detector is higher than the second cancellation temperature even after a predetermined time has elapsed since a start of the print suspension mode, and wherein the processing circuitry is configured to change at least one of the second execution temperature or the second cancellation temperature at next execution of the intermittent print mode or the print suspension mode, after the heater stops heating the fixing device in the print suspension mode.

10. A method comprising:

switching a continuous print mode that continuously performs a print operation on a plurality of sheets to a first intermittent print mode that alternately repeats a print operation on a predetermined number of sheets and a print operation suspension for a predetermined time, when an internal temperature of an image forming apparatus detected by a temperature detector is equal to or higher than a first execution temperature during execution of the continuous print mode;

cancelling the first intermittent print mode and switching the first intermittent print mode to the continuous print mode, when the internal temperature detected by the temperature detector is equal to or lower than a first cancellation temperature, which is lower than the first execution temperature; and cancelling the first intermittent print mode and switching the first intermittent print mode to a second intermittent print mode, when the internal temperature detected by the temperature detector is higher than the first cancellation temperature after a predetermined time has elapsed since a start of execution of the first intermittent print mode, wherein during the first intermittent print mode, heating of a fixing device by a heater is performed as the continuous print mode, and wherein during the second intermittent print mode, the heating of the fixing device by the heater is turned off.

11. The method according to claim 10, wherein, under a first control, the method further comprises:

switching the first intermittent print mode to a print suspension mode that suspends a print operation, when the internal temperature detected by the temperature detector is equal to or higher than a second execution temperature, which is higher than the first execution temperature, during execution of the first intermittent print mode; and cancelling the print suspension mode and switching the print suspension mode to the first intermittent print mode, when the internal temperature detected by the temperature detector is equal to or lower than a second cancellation temperature, which is higher than the first cancellation temperature and lower than the second execution temperature.

12. The method according to claim 11, further comprising displaying a message for lowering the internal temperature of the image forming apparatus on a display when the first intermittent print mode is switched to the print suspension mode.

13. The method according to claim 11, wherein, under a second control, the method further comprises continuously executing the first intermittent print mode and/or the second intermitted print mode without being switched to the print suspension mode, irrespective of whether the internal temperature detected by the temperature detector is equal to or higher than the second execution temperature during execution of the first intermittent print mode and/or the second intermitted print mode, and wherein the method further comprises changing operation of the image forming apparatus between the first control and the second control.

14. The method according to claim 11, further comprising causing the heater to stop the heating of the fixing device, when the internal temperature detected by the temperature detector is higher than the second cancellation temperature even after a predetermined time has elapsed since a start of the print suspension mode.

15. The method according to claim 14, further comprising causing the heater to stop the heating of the fixing device from a start of next execution of the first intermittent print mode or the print suspension mode, after the heater stops heating the fixing device in the print suspension mode.

16. The method according to claim 14, further comprising changing at least one of the second execution temperature or the second cancellation temperature at next execution of the first intermittent print mode or the print suspension mode, after the heater stops heating the fixing device in the print suspension mode.

17. The method according to claim 10, further comprising controlling turning on and off the heater based on a fixing temperature in the fixing device in the continuous print mode, wherein the temperature detector is a temperature sensor that detects a temperature of an image forming unit that forms a toner image on a surface of a photoconductor.

* * * * *